Sept. 25, 1951 — C. COOPER — 2,568,791
PORTABLE POWER DRIVEN HACK SAW
Filed June 10, 1946 — 4 Sheets-Sheet 1

Inventor
Corbert Cooper
By Randolph & Beavers
Attorneys

Sept. 25, 1951 C. COOPER 2,568,791
PORTABLE POWER DRIVEN HACK SAW
Filed June 10, 1946 4 Sheets-Sheet 2
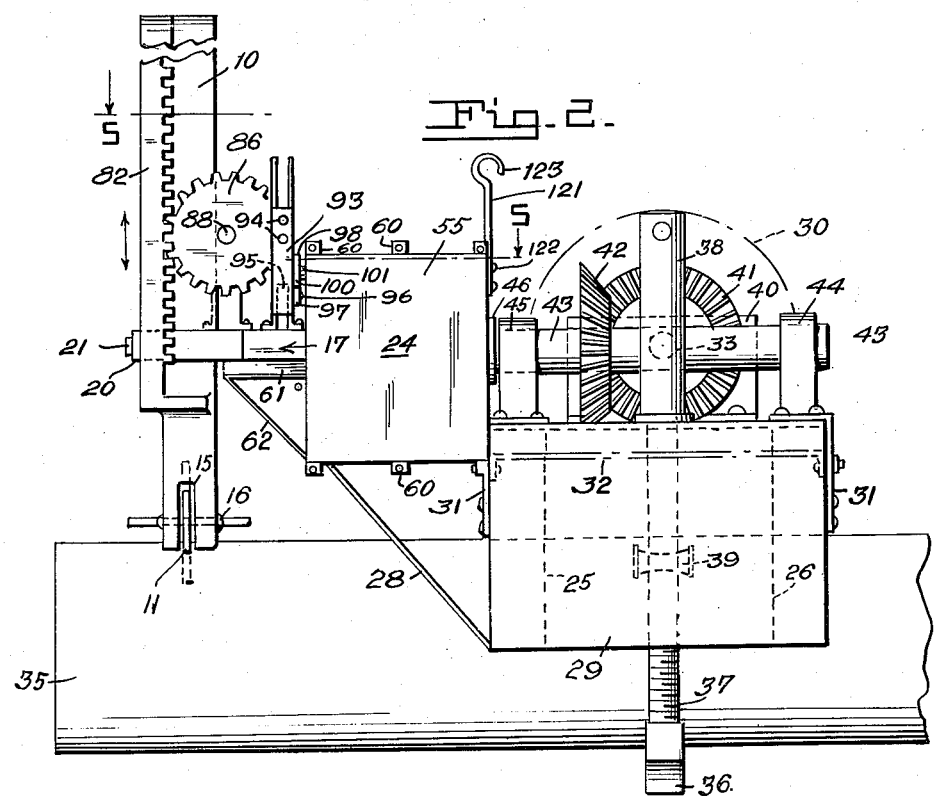
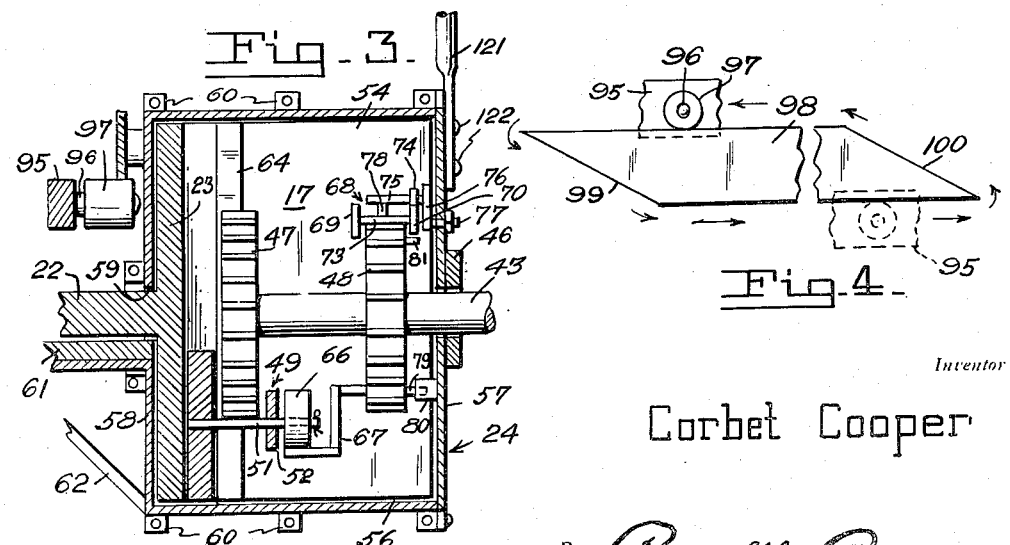
Inventor
Corbet Cooper
By Randolph & Beavers
Attorneys

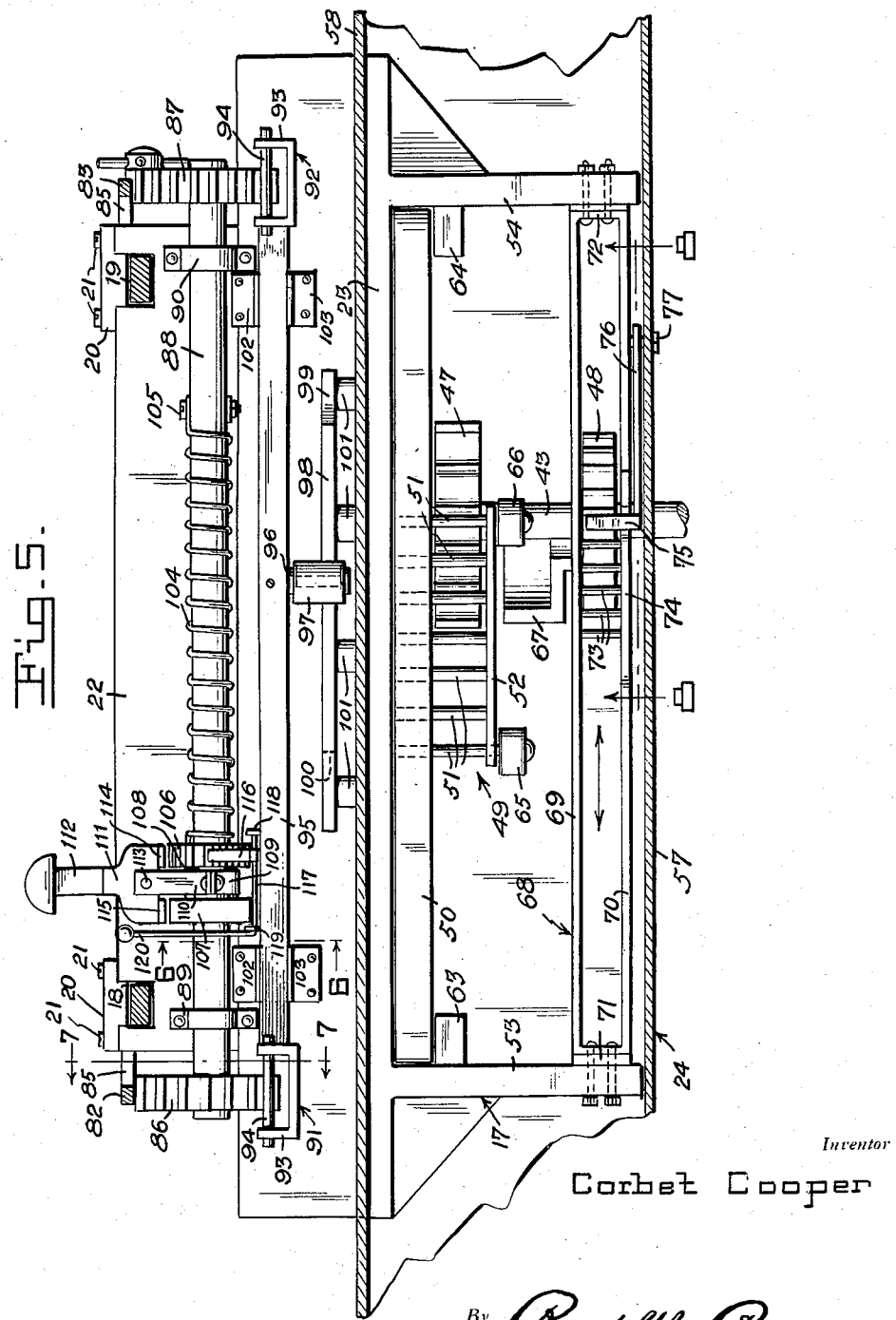

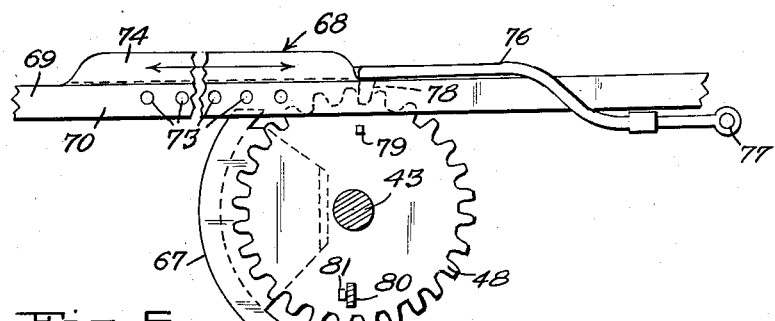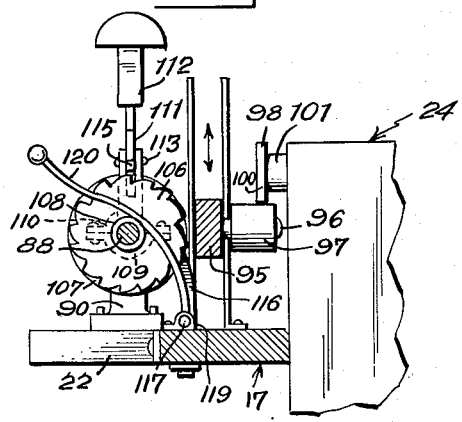

Patented Sept. 25, 1951

2,568,791

UNITED STATES PATENT OFFICE 2,568,791

PORTABLE POWER-DRIVEN HACK SAW

Corbet Cooper, Beaver Dam, Ky.

Application June 10, 1946, Serial No. 675,723

4 Claims. (Cl. 29—73)

This invention relates generally to power driven hack saws and the like and more particularly to a tool of this type which is particularly well suited for use by electricians in cutting conduit, pipe, bar stock, small angle iron, channel iron and the like.

An important object of the present invention is to provide a new and improved means for imparting reciprocatory movement to the saw without the use of a wheel or crank and the connecting rod usually associated therewith.

Still another object is to provide a new and improved means for applying cutting pressure to the saw during the cutting stroke thereof without increasing the overall weight of the tool.

A further object is to provide new and improved means for raising the saw at the end of the cutting stroke thereof in order to prevent the teeth of the saw blade from dragging during the back stroke of the saw.

Yet another object is to provide a saw raising means of the aforedescribed character which also serves to prevent rocking motion of the saw during reciprocatory movement thereof.

A still further object is to provide a portable power driven work tool having new and improved means for releasably clamping the tool to the work.

An ancillary object is to provide a counterbalanced and readily manipulatable support for the work tool whereby the same may be moved to and from the work with ease and may be supported thereon in clamped relation thereto without bending or otherwise damaging the work.

Still other objects, features and advantages of the present invention are those inherent in or implied from the novel construction, combination and arrangement of the several parts comprising the embodiment illustrated in the accompanying drawings and constituting the best mode thus far devised for effectuating the principles of the invention.

In the accompanying drawings:

Figure 2 is an end elevation of the cutting tool as seen from the right in Figure 1;

Figure 3 is a somewhat enlarged sectional view of the housing for the reciprocable driving means as seen along the line 3—3 of Figure 1;

Figure 4 is a detail view of the cam and roller members comprising a portion of the lifting means for the saw;

Figure 5 is a sectional view taken substantially along the line 5—5 of Figure 2;

Figure 6 is a sectional view taken along the line 6—6 of Figure 5;

Figure 7 is a sectional view taken along the line 7—7 of Figure 5;

Figure 8 is a sectional view as seen along the line 8—8 of Figure 5, and

Figure 9 is a view in elevation of the counterbalanced support for the cutting tool.

Figure 1:
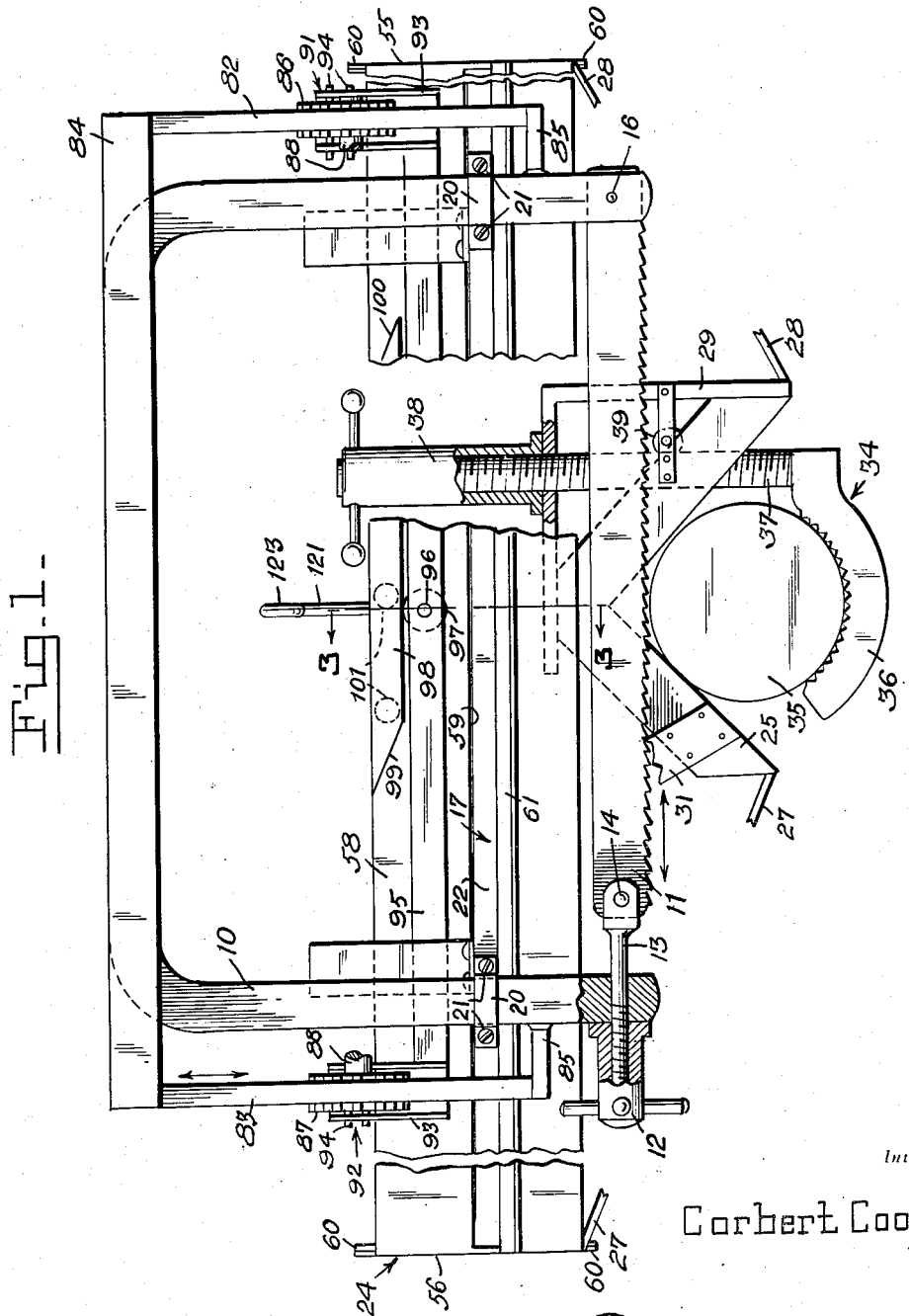
Figure 1 is a front elevation partly in section, of the cutting tool of the present invention according to the preferred embodiment thereof.

Referring now to the drawings for a more complete understanding of the invention and more particularly to Figures 1, 2, and 5 thereof, it will be seen that a conventional hack saw is employed comprising the usual inverted U-shaped frame 10 having a cutting blade 11 releasably secured between the ends thereof and in adjustable tension therein controllable by the hand wheel 12 which threadedly engages a clevis 13 to which one end of the blade is secured as by a pin 14, the other end of the blade being retained within a slot 15 in frame 10 and secured thereto as by a pin 16.

Saw frame 10 is supported on a reciprocable member 17 for vertical sliding movement with respect thereto, the upright portions of the frame being received into slots 18 and 19 respectively in member 17 and retained therein by suitable clamps 20 secured to member 17 as by screws 21.

Member 17, except for the projecting portion 22 thereof which supports the saw and the saw lifting and pressure means, hereinafter to be described, is enclosed within a housing 24. The housing is supported in any suitable manner on the forward end of a pair of spaced V-shaped work engaging members 25 and 26 and braced thereto from the ends thereof as by a pair of rods 27 and 28, respectively.

V-shaped members 25 and 26 are interconnected by an angle plate 29 which may be welded thereto and the top side of which may serve as a support for a motor, indicated at 30, for supplying the rotary motion from which the reciprocatory motion for driving the saw is derived, as will presently appear. The motor may be additionally supported as by braces 31, 32; this being particularly desirable when an electric drill is employed as the power source. In this case, the chuck of the drill is secured to a shaft 33 which preferably is grooved or otherwise formed to receive the chuck. When a permanent motor is employed, shaft 33 may be the motor shaft, as is desired. Shaft 33 also may be journaled in a plate 40 supported on angle plate 29.

A third releasable work engaging member 34 is provided to grip the work piece 35 intermediate the pair of fixed work engaging members 25 and 26. Member 34 comprises a jaw or clamp 36 to one end of which is secured a threaded rod 37 which projects through angle plate 29 and threadedly engages a sleeve 38 having suitable handles, as shown, for rotating the sleeve to produce axial movement of rod 37 with respect thereto, whereby to move jaw 36 to and from the work piece 35. A roller 39 having a periphery conforming to the outer diameter of rod 37 is employed as a guide therefore and may be supported on members 25 and 29, as shown.

Shaft 33 has secured thereto a bevel gear 41 which drives a bevel gear 42 secured to a shaft 43 supported in bearings 44 and 45, in turn supported on and secured to angle plate 29 in any suitable manner. Shaft 43 may also be journaled in housing 24 as at 46, if desired. Within the housing, shaft 43 carries a pair of gears 47 and 48 of which gear 47 is secured thereto and drives a rack 49 which comprises an elongated reciprocatory driving member 50 having a plurality of pins 51 with which the teeth of gear 47 mesh. Pins 51 preferably are additionally supported by an auxiliary member 52.

Rack member 50 is loosely retained at the ends thereof between a pair of guide blocks 53 and 54 and adjacent vertical plate 23 by means of guide members 63 and 64. Members 53, 54, 63 and 64 together with projection 22 comprise the reciprocable member 17, and may be integrally formed as a single unit. Members 23, 53 and 54 extend from top to bottom within the housing and together extend from front to back thereof and thus move as a piston within the housing. For this reason the housing is fabricated of side walls having unobstructed inner surfaces comprising end walls 55 and 56, a back 58 having a slot 59 in the front wall thereof through which the projecting portion 22 of member 17 extends. To this end, the various housing members are provided with external lugs 60 adapted to receive suitable bolts, screws, or the like for securing the housing together as a unit.

The housing also preferably is provided externally with a horizontal member 61 which may be braced from the housing as at 62 and which serves as an additional slidable support for projecting portion 22 of member 17.

By reason of the aforedescribed relation between rack member 50 and several parts of member 17, they are cooperatively retained for driving movement therebetween, reciprocatory movement of member 50 being imparted to member 17 as the ends of member 50 engage or abut against the guide blocks 53 and 54. For this purpose, the ends of member 50 are rounded so as to permit free vertical movement thereof as the end teeth or pins 51 on rack 50 move above and below gear 47 respectively to reverse the direction of movement of member 50.

For this purpose, the end pins on rack 50 support a pair of rollers 65 and 66 respectively. Rollers 65 and 66 are arranged to engage an arcuate guide member 67 carried by gear 48, member 67 being positioned so as to cause the rollers to move about shaft 43 in a concentric path conforming to the path traversed by the end pins of rack 50 about gear 47. To this end, gear 48 which is mounted on shaft 43 for free rotation thereabout, is driven by rack 68 comprising spaced side members 69 and 70 secured to guide blocks 53 and 54 as at 71 and 72 and having a plurality of pins 73 secured therebetween for coaction with the teeth of gear 48.

Rack member 70 has an upstanding cam portion 74 which is arranged to engage the transverse portion 75 of a lever 76 which is supported for pivotal movement about a pin 77 secured to the housing. The transverse portion 75 has depending therefrom a lug or dog 78 which enters between adjacent teeth of gear 48 to prevent rotation thereof about shaft 43 during the transfer movements of rack 50 to positions above and below gear 47.

Thus, assuming shaft 43, as viewed in Figure 5, to be moving clockwise, the right end pin 51 is moving to the right as the cutting stroke is in progress. Before the left end pin 51 moves into the position presently occupied by the right end pin, cam portion 74 moves under lever portion 75 thereby causing lever 76 to rock about pin 77 to withdraw dog 78 and release gear 48 for rotation. At this moment the right end pin 73 or rack 68 engages gear 48 to drive the same as the rack 68 moves to the right together with reciprocable member 17. Gear 48 then rotates until the left end pin 73 moves out of engagement with the teeth of gear 48. At this moment, a lug 79 on gear 48 engages a stop 80 on the housing thereby to prevent further clockwise rotation of gear 48. During this movement of gear 48, guide member 67 is moved through approximately 180 degrees, rack 68 being provided with a sufficient number of teeth or pins 73 to move gear 48 through approximately one-half revolution. When rack 68 has moved to the right sufficiently to cause transverse portion 75 to move down off cam 74, dog 78 moves down to engage the teeth of gear 48 to lock the same against rotation in either direction, thus placing guide member 67 in a position to receive roller 65 when the left end pin 51 of rack 49 reaches the position of the right end pin 51 as seen in Figure 5.

As roller 65 enters guide member 67 it is forced downwardly about an arcuate path conforming to that of the effective driving periphery of gear 47 whereby pin 51, upon which roller 65 is mounted, is caused to move downwardly about gear 47 in continuous meshed engagement therewith during 180 degrees of rotation thereof. Driving gear 47 thus proceeds to drive rack 49 to the left, as viewed in Figure 5, the rack for this movement, which is the back-stroke movement of the saw, being underneath gear 47.

As rack 68 moves to the left, cam 74 again engages lever 76 to withdraw lug 78 after which the left end pin 73 engages gear 48 to drive the same until guide member 67 is restored to its position as seen in Figure 5, further movement in the counterclockwise direction being arrested by lug 81 which engages stop 80.

When rack 68 has moved to the left sufficiently, transverse portion 75 rides down off cam 74 and dog 78 drops into engagement with gear 48 to lock guide 67 in this position against rotation in either direction. Thus, as roller 66 enters guide 67, pin 51 associated therewith is forced to follow gear 47 in continuous engagement thereof through approximately 180 degrees whereupon it reaches the position as seen in Figure 5, thus completing a cycle of one forward and one backward movement of the reciprocating member 17 and consequently a complete reciprocatory cycle of the hack saw carried thereby.

The aforementioned pressure and lifting means 23 is employed to automatically apply pressure to the hack saw during the forward or cutting stroke thereof and to lift the saw blade from the work piece during the back stroke of the saw. To this end, a pair of racks 82 and 83 are secured to saw frame member 10 across the bight portion thereof as by a similar cross member 84 and 85 preferably being welded to the saw frame as indicated.

Racks 82 and 83 are driven by spur gears 86 and 87, respectively, associated therewith, these gears being mounted for rotation with a shaft 88 which is supported in spaced bearings 89 and 90, in turn, supported on projection 22 and secured thereto preferably as indicated.

Gears 86 and 87 are arranged to be driven by a pair of racks 91 and 92, respectively, these racks each being formed of a channel iron 93 and a plurality of pins 94 extending across the channels therein. Channel members 93 are interconnected by a longitudinal member 95 which carries a stub shaft 96 upon which is mounted a roller 97. Roller 97 is arranged to ride along the periphery of a cam bar 98 which is tapered or beveled as at 99 and 100 and is secured to the housing 24 and spaced therefrom by means of a plurality of tubular spacers 101 which receive screws (not shown) for securing the cam bar to the housing.

Longitudinal member 95 is guided through the vertical movement imparted to it by reason of the travel of roller 96 about cam bar 97 by means of two pairs of spaced guide members 102 and 103, one pair of each of these members being disposed adjacent racks 91 and 92 and the members being secured to projection 22 so as to extend adjacent member 95 on opposite sides thereof.

A coil spring 104 is sleeved about shaft 88 and secured thereto at one end as by a bolt 105. The other end of the spring is secured in any suitable manner to a ratchet wheel 106 which may be integrally formed with a wheel or disc 107 with a hub portion 108 extending therebetween. This assembly is mounted for free rotation about shaft 88. A two part sleeve 109, 110 is secured about hub 108 for rotation relative thereto, part 110 having a bifurcated lever portion adapted to receive therein the flattened portion 111 of a control lever 112 which is pivotally secured to sleeve part 110 by pin 113. Flattened portion 111 is extended to one side of pin 113 as at 114 to engage ratchet wheel 106 and to the other side of pin 113 as at 115 so as to engage the periphery of wheel or disc 107 when lever 112 is moved in the direction thereof.

A dog or ratchet finger 116 is provided to prevent reverse movement of ratchet wheel 106 in the usual manner, dog 116 being secured to a shaft 117 which is supported for rocking movement on projection 22 by means of bearings 118 and 119. An operating lever 120 is also secured to shaft 117 and is bent so as to lie over shaft 88 whereby gravity acting upon the lever causes dog 116 to be urged into engagement with ratchet wheel 106.

In applying pressure to cutting blade 11, lever 112 is moved to the right, as seen in Figure 5, to engage ratchet wheel 106 and thereafter is moved repeatedly about shaft 88 in a series of ratcheting movements to wind up spring 104 until a desired amount of torque is imparted to shaft 88 from the coil spring, dog 116 preventing rotation of the ratchet wheel to unwind the spring in the reverse direction. The torque thus developed in shaft 88 is transmitted to gears 86 and 87 and thence to racks 82 and 83 associated therewith, thereby urging saw frame 10 downwardly and blade 11 into contact with the work piece with pressure in an amount controlled by the degree of tension in spring 104.

During the cutting stroke of the saw, roller 97 is above cam bar 98 and hence pins 94 of racks 91 and 92 are disengaged from gears 86 and 87 associated therewith. Thus, during the cutting stroke, these gears are free to rotate under power of coil spring 104.

When it is desired to reduce the pressure on the saw blade, lever 112 is operated, as above, to take the pressure off ratchet finger 116 so that lever 120 may be moved away from shaft 88 to rock shaft 117 and move the ratchet finger out of the path of the teeth of ratchet wheel 106. Lever 112 is then rocked to the left, as seen in Figure 5, whereupon the ratchet wheel is released for rotation under power of spring 104, thereby to reduce the tension therein. Lever 112 preferably is moved sufficiently to the left so as to cause extended portion 115 thereof to engage wheel 107 with sufficient pressure therebetween as to serve to either brake or arrest the motion of the ratchet wheel, whichever effect is desired.

The manner in which the cutting blade is lifted from the work piece during the back stroke of the saw will now be described. As roller 97 passes beyond the left end of cam bar 98, as viewed in Figure 1, the assembly including racks 91 and 92 and member 95 moves down under the force of gravity until pins 94 of racks 91 and 92 strike the teeth of gears 86 and 87, thus moving the axis of roller 97 below the upper edge of cam bar 98. Thus, as the return stroke of the saw gets underway, roller 97 is caused to move along beveled edge 99 to force racks 91 and 92 downwardly, whereupon gears 86 and 87 are driven to force racks 82 and 83 and thus the saw blade from the work piece whereby dragging of the blade on the return stroke of the saw is obviated.

As roller 97 passes beyond the right end of cam bar 98 upon completion of the back stroke, racks 91 and 92 are driven upwardly by reason of the rotation of gears 86 and 87 under power of coil spring 104 which is further tensioned during lifting of the saw. Roller 97, therefore, is raised such that the same is caused to move upwardly along beveled edge 100 of the cam bar as the cutting stroke gets underway.

From the foregoing, it will readily be seen that gears 86 and 87 and their coacting racks 82 and 83 also serve to prevent rocking movement of the saw during the cutting stroke thereof, the gears being in continuous engagement with the racks.

A support 121 is secured to housing 24 as at 122, which preferably is at the center of gravity of the tool, and has formed on the other end thereof, a hook 123 which is adapted to receive a ring 124 (Figure 9) secured to the end of a length 125 of cable, rope or the like. The other end of cable 125 is secured to a counterweight 126 which may take the form of a bucket of sand, water, or other suitable mass. Cable 125 is trained over a pair of pulleys 127 and 128, which are maintained in spaced relation as by a rod 129, and also over an intermediate pulley 130.

Rod 129 is slidably supported between pulley 130 and a pair of pulleys 131 and 132, which are pivotally supported on a standard 133, pulleys 131 and 132 being supported on braces 134 and 135 which are secured to the standard as at 136 and pulley 130 being rotatively supported on the standard as at 137.

Standard 133 is supported for turning movement within a socket member 138 having a bracket 139 which is adapted to be secured as at 140 to a suitable member of a work bench having a vise for holding the work pieces to be cut by the saw. The standard may further be supported for pivotal movement within a brace 141 which may be secured as by screws 142 to the end of the bench top.

In the use of the aforedescribed apparatus for cutting conduit, for example, the conduit is placed in the vise, the saw pulled over the conduit, clamped thereto and the cutting operation begun. When the cut is completed, the saw is withdrawn from the conduit and pushed back out of the way, rod 129 either sliding along pulleys 130, 131 and 132, or swinging about the axis of standard 133, or both. The conduit is then threaded without removing it from the vise.

Whereas the cutting tool could be manually lifted to place the same on the work piece, it will readily be appreciated that the aforedescribed counterbalanced crane for supporting the work tool provides a time saving and convenient means for handling the tool while at the same time preventing the tool from bending or otherwise damaging the work piece by reason of the weight thereof in the absence of the counterbalancing means. Since cutting pressure is not derived from the weight of the cutting tool the same may be fully counterbalanced and of optimum lightness.

From the foregoing it should now be apparent that a cutting tool and a support therefor have been provided which are well adapted to fulfill the aforestated objects of the invention and, while the invention has been described with respect to but one embodiment thereof which gives satisfactory results, it is my intention in the appended claims to cover all such further embodiments and modifications thereof which fall within the spirit and scope of the invention.

What I claim as my invention is:

1. In a cutting tool of the character disclosed, in combination with a hack saw, a stationary structure, a saw carrier connected to the stationary structure, said saw being slidably connected to the saw carrier for movement toward and away from a work piece to be cut thereby, said saw carrier being slidably supported on the stationary structure for reciprocating movement with the saw transversely of the work piece, a rack secured to the hack saw, a spring actuated pinion journalled in the saw carrier and meshing with the rack for yieldably urging the saw into cutting relation with the work piece, means mounted on the stationary structure for imparting reciprocatory movement to the saw carrier, and cam means including a roller, a rack engaging the pinion and slidably connected to the saw carrier on which the roller is journalled and supported to engage a horizontally disposed cam element fixed to the stationary support for raising the saw from the work piece during the back stroke of the saw, said last mentioned rack being displaced downwardly by gravity to engage under the cam element to turn the pinion to elevate the hack saw and being displaced upwardly by the spring acting on the pinion to engage over the cam element to permit the spring to urge the saw downwardly toward the work piece.

2. In a cutting tool of the character disclosed, in combination with a hack saw including a saw frame and blade, a saw carrier to which the saw is slidably connected for reciprocating movement in one plane with respect thereto, a pair of gear racks disposed parallel to said plane of movement of the saw in the saw carrier and supported by the saw, a pair of spur gears individual to said pair of gear racks, a spring loaded shaft secured to said gears and journalled on said saw carrier, a second pair of gear racks disposed in engageable relation to said gears and on opposite sides thereof from said first pair of gear racks, a cross member reciprocally connected to the saw carrier for movement in the same direction as the saw and interconnecting said second pair of gear racks, a stationary structure to which the saw carrier is connected for reciprocatory movement in directions at a right angle to the plane of movement of the saw in the saw carrier, a cam bar secured to the stationary member, a roller journalled on the cross member and disposed to ride along the periphery of the cam bar to raise and lower the cross member and last mentioned gear racks as the roller moves between the lower and upper edges of the cam bar, said cross member being moved by gravity in one direction, said shaft being spring biased to turn in a direction to displace the cross member a limited distance in the opposite direction, and means supported by the stationary structure for imparting reciprocating motion to the frame.

3. In a cutting tool of the character disclosed, in combination with a hack saw including a saw frame and blade, a frame having means for supporting the saw for vertical movement with respect thereto, a pair of vertically disposed gear racks connected to the saw, a pair of spur gears individual to said pair of gear racks, a shaft secured to said gears and connected to and journalled for rotation on said frame, a second pair of gear racks disposed in engageable relation to said gears and on opposite sides thereof from said first pair of gear racks, a cross member interconnecting said second pair of gear racks and slidably connected to the frame for vertical reciprocating movement thereon, a stationary housing connected to and supporting said frame for horizontal reciprocatory movement, means supported by the housing for imparting reciprocating motion to the frame, a horizontally disposed cam bar secured to the housing, a roller connected to and journalled on said cross member and disposed to ride along the periphery of the cam bar to raise and lower the cross member to impart rotation to the spur gears for raising and lowering the saw as the roller moves between lower and upper edges of the cam bar, a coil spring sleeved about said shaft and secured thereto at one end thereof, a ratchet wheel mounted on the shaft for free rotation thereon and secured to the other end of the spring, means for causing ratchet movements of the ratchet wheel to tension the spring in a direction to turn the spur gears to move the saw downward and the cross member upward with respect to said frame, a ratchet finger for releasably retaining the ratchet wheel in a moved position, means including a lever for releasing the ratchet finger, and brake means associated with said ratchet means for braking or arresting movement of the ratchet wheel under power of the spring when the ratchet wheel is released.

4. In a cutting tool of the character disclosed, in combination with a hack saw including a blade and saw frame, a supporting structure, a saw carrier on which the hack saw is mounted, means connecting the saw carrier to the supporting structure for reciprocating movement in a horizontal plane, means connecting the saw frame to the saw carrier for reciprocating movement relatively to the saw carrier only in vertical plane, power means secured to the supporting structure and connected to the saw carrier to reciprocate the saw carrier in the supporting structure for moving the hack saw in its cutting operation, a rack fixed to the saw frame, a pinion journalled on the saw carrier and meshing with the rack, a spring secured to the saw carrier and connected to the pinion to turn the pinion in a direction to cause the saw frame to slide downwardly in the saw carrier in a direction to move the saw blade into a work engaging position, a bar, means connecting the bar to the carrier for vertical sliding movement relatively thereto, a rack secured to the bar and movable into and out of engagement with the pinion, said pinion being disposed between the racks, an elongated horizontally disposed track fixed to the supporting structure having top and bottom track surfaces and oppositely inclined end surfaces merging with the top and bottom surfaces, and a roller journalled on said bar and disposed to engage the track, said bar and roller being displaced downwardly by gravity as the roller passes off of one end of the top surface of the track to move the last mentioned rack downwardly into engagement with the pinion, said roller being displaced downwardly into engagement with the bottom track surface by engagement with one inclined end of the track when the bar is moved by the saw carrier in the opposite direction to turn the pinion in a direction to elevate the first mentioned rack to raise the hack saw to an inoperative position and to tension the spring, said roller thereafter moving out of engagement with the bottom track surface whereby the spring is released to displace the hack saw and the first mentioned rack downwardly into a work engaging position and for elevating the last mentioned rack, bar and roller to position the roller to engage the other inclined end of the track and be cammed upwardly thereby onto the top track surface when the saw carrier and bar are moved in the opposite, first mentioned direction.

CORBET COOPER.

REFERENCES CITED

The following references are of record in the file of this patent:

UNITED STATES PATENTS

| Number | Name | Date |
|---|---|---|
| 874,553 | Williams | Dec. 24, 1907 |
| 1,294,593 | Zimmerman | Feb. 18, 1919 |
| 1,509,789 | Stanton et al. | Sept. 23, 1924 |
| 1,898,956 | Harvie | Feb. 21, 1933 |
| 1,900,304 | Roe | Mar. 7, 1933 |
| 2,011,623 | French | Aug. 20, 1935 |
| 2,174,837 | Rasmussen | Oct. 3, 1939 |
| 2,175,111 | Duvall | Oct. 3, 1939 |
| 2,182,234 | Pneuman | Dec. 5, 1939 |
| 2,228,485 | Reed | Jan. 14, 1941 |
| 2,307,174 | Wachs | Jan. 5, 1943 |
| 2,329,729 | Saucke | Sept. 21, 1943 |
| 2,436,692 | Greene | Feb. 24, 1943 |